United States Patent
Kono et al.

(10) Patent No.: US 7,142,245 B2
(45) Date of Patent: Nov. 28, 2006

(54) CONVERSION OF FRAME RATE ACCORDING TO IMAGE DATE

(75) Inventors: Masaru Kono, Shiojiri (JP); Miki Nagano, Shiojiri (JP); Norihiro Yoshikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 10/691,578

(22) Filed: Oct. 24, 2003

(65) Prior Publication Data

US 2004/0136686 A1    Jul. 15, 2004

(30) Foreign Application Priority Data

Nov. 7, 2002    (JP)    ............. 2002-324251

(51) Int. Cl.
*H04N 11/20*    (2006.01)
(52) U.S. Cl. ...................... 348/441; 348/744
(58) Field of Classification Search ............. 348/441, 348/459, 700, 554; 345/475; 386/68, 77, 386/123

See application file for complete search history.

(56) References Cited

U.S. PATENT DOCUMENTS

| | | | |
|---|---|---|---|
| 4,876,596 A | 10/1989 | Faroudja | |
| 5,561,465 A * | 10/1996 | Fautier et al. | 375/240.12 |
| 6,069,664 A | 5/2000 | Zhu et al. | |
| 6,469,744 B1 | 10/2002 | Pearlstein | |
| 6,549,240 B1 * | 4/2003 | Reitmeier | 348/459 |
| 6,728,317 B1 * | 4/2004 | Demos | 375/240.21 |
| 6,728,477 B1 * | 4/2004 | Watkins | 386/125 |
| 2002/0149696 A1 * | 10/2002 | Cok et al. | 348/459 |
| 2003/0137606 A1 * | 7/2003 | Rumreich et al. | 348/675 |
| 2003/0184679 A1 * | 10/2003 | Meehan | 348/565 |

FOREIGN PATENT DOCUMENTS

| | | |
|---|---|---|
| JP | 05-344480 | 12/1993 |
| JP | 06-078279 | 3/1994 |
| JP | 11-243507 | 9/1999 |
| JP | 2001-333391 | 11/2001 |
| JP | 2001-346131 | 12/2001 |
| JP | 2002-500480 | 1/2002 |
| WO | WO 99/34597 | 7/1999 |

\* cited by examiner

*Primary Examiner*—Victor R. Kostak
(74) *Attorney, Agent, or Firm*—Oliff & Berridge, PLC

(57) ABSTRACT

A projector is provided to suppress the degradation of the image quality of movies that are displayed on an image display device. The projector is configured to have a DVD playback function. Accordingly, when movie data that was read out from a DVD includes a movie film having a frame rate of 24 fps, a frame rate conversion unit converts the frame rate from 24 fps to 72 fps without performing a 2 to 3 pull down telecine conversion. In addition, the driving frequency of a liquid crystal panel is also switched to 72 Hz according to the conversion of frame rate.

10 Claims, 5 Drawing Sheets

CONVERSION OF FRAME RATE ACCORDING TO IMAGE DATE

BACKGROUND OF THE INVENTION

1. Field of the Invention

The present invention relates to a frame rate conversion according to image data.

2. Description of the Related Art

Conventionally, so called DVD (Digital Versatile Disk) players are in widespread use. A DVD player reads out movie data recorded in a DVD, and converts and outputs the data as interlace signals that have a vertical sync frequency of 60 (Hz), so as to make the data displayable on a TV. In case where the movie data recorded in the DVD is a movie film of 24 frames per second, the DVD player performs a so-called "2 to 3 pull down telecine conversion" (hereinafter simply referred to as a telecine conversion) and outputs the data.

In recent years, there is also an attempt to connect a DVD player to a projector, so as to project movies that were played back in the DVD player. The projector converts interlace signals of 60 (Hz), which were received from the DVD player, into progressive (non-interlace) signals through image processing and displays movies.

In the telecine conversion, however, successive two frames are displayed at different rates i.e. two frames and three frames respectively, which deteriorates a smooth movement of movies of the film. Furthermore, there has been a degradation of image quality in the projector due to the IP conversion that converts interlace signals into progressive signals. These problems are not confined to projectors, but are rather common to any image display device that progressively displays movies

SUMMARY OF THE INVENTION

The present invention addresses to suppress the degradation of the image quality of movies that are to be displayed on an image display device.

An image display device of the present invention displays images on an image generation unit that is switchable of driving frequency. The image display device comprises an input unit, a detection unit, a decision unit, a frame rate conversion unit, and a driving frequency control unit. The input unit inputs movie data. The detection unit detects a frame rate of the movie data. The decision unit decides whether or not a conversion of frame rate is necessary based on the frame rate. The frame rate conversion unit converts the frame rate by multiplying the frame rate by n (n is an integer that is equal to or more than 2), when it was decided that the conversion of the frame rate is necessary. The driving frequency control unit switch-controls a driving frequency of the image generation unit so as to synchronize it with the frame rate.

The frame rate can be detected in various ways. In case where the movie data contains frame rate-detectable data, the detection unit can use the frame rate-detectable data to detect the frame rate. For example, as for the movie data that was compressed under MPEG2 (Trade Mark), which is a compression technique used in DVDs, a frame rate code representing a display cycle of images corresponds to the frame rate-detectable data. The frame rate-detectable data may be input separately from the movie data. In addition, the detection unit may also detect the frame rate based on a synchronous signal included in each frame.

The decision unit compares the frame rate that was detected in the detection unit and a preset predetermined value to decide whether or not a conversion of frame rate is necessary. The conversion of frame rate may be decided necessary when the detected frame rate is less than the predetermined value, or when the detected frame rate is more than the predetermined value, or when the detected frame rate is equal to the predetermined value. For example, the conversion of frame rate may be decided necessary when the movie data comprises a movie film that has a frame rate of 24 (fps). This is because the image display device preferably avoids driving the image generation unit in 24 (Hz) in order to suppress flickers of the displayed movie.

The frame rate conversion unit converts the frame rate by multiplying the frame rate by n. For example, the frame rate conversion unit can convert the frame rate of a movie film i.e. 24 (fps) into the triple i.e. 72 (fps). By this means, the frame rate can be converted through e.g. the telecine conversion in a way not to cause a bias in the use of frame images for displaying each frame.

The driving frequency control unit switches the driving frequency of the image generation unit to the m multiples (m is a natural number) of the frame rate so as to synchronize the driving frequency with the frame rate after the conversion. With the present invention, it is thus possible to suppress the degradation of the image quality of movies and to display with the smooth movement.

In the image display device of the present invention, the frame rate conversion unit can convert the frame rate by repeatedly outputting each identical frame for n times. In this way, the frame rate can be converted easily.

Additionally, in the image display device of the present invention, the frame rate conversion unit may also convert the frame rate by, based on chronologically successive two frames, generating and inserting (n−1) predictive frames to be inserted between the two frames. In this way, movies can be displayed with a more smooth movement.

In the image display device of the present invention, the input unit may input voice data along with the movie data; and the image display device may further comprise a transmission unit for wirelessly transmitting the voice data to a voice output device which is separate from the image display device, such as speakers.

In case where the image display device is a projector, for example, the image display device may sometimes be placed behind its user and the voice output device may sometimes be placed in front of the user. In this case, the voice data needs to be transmitted from the image display device to the voice output device. Transmitting the voice data through a wireless communication makes it to remove the burden of wiring the voice output device.

It is preferable that the image display device described above further comprises a timing adjustment unit that adjusts at least one of an image generation timing of the image generation unit and a transmission timing of the transmission unit, so as to synchronize an output timing of voice and the image.

There may sometimes be a delay of processing timing between the movie data processing and the voice data processing. With the present invention, it is possible to reduce the delay. An adjustment amount of the delay may be set based on a piece of information regarding an adjustment time, such as the distance between the image display device and the voice output device, which may be manually input by the user or may be automatically set.

The image display device of the present invention may further comprise a readout unit that reads out the movie data from a given recording medium. In this embodiment, the input unit may input the movie data from the readout unit.

As for the given recording medium, media such as DVD, CD, or hard disk may be used. With the present invention, it is possible to read out and display movie data from these recording media. The present invention is configured as an image display device that incorporates a playback device for e.g. DVDs.

The present invention may also be configured as an invention of a playback device. That is to say, a playback device of the present invention plays back movie data recorded in a given recording medium. The playback device is characterized in comprising a readout unit, a detection unit, a decision unit, a frame rate conversion unit, and an output unit. The readout unit reads out the movie data from a given recording medium. The detection unit detects a frame rate of the movie data. The decision unit decides based on the frame rate whether or not a conversion of the frame rate is necessary. The frame rate conversion unit converts the frame rate by multiplying the frame rate by n (n is an integer that is equal to or more than 2), when it was decided that the conversion of the frame rate is necessary. The output unit outputs the movie data.

By this means, as in the previous description with respect to the invention of an image display device, the frame rate can be converted through e.g. a telecine conversion in a way not to cause a bias in the use of frame images for displaying each frame. Accordingly, it is possible to display movies in a smooth movement by using an image display device comprising an image generation unit, which is switchable of driving frequency according to the frame rate of the input movie data.

In addition to the configuration as an image display device and the configuration as a playback device of movie data, the present invention can also be configured as an invention of a method of controlling an image display device and an invention of a method of playing back movie data. The present invention can also be implemented in various aspects, such as a computer program for implementing the configurations described above, a recording medium that is recorded with the program, or data signals that are embodied in carrier waves with the program included therein. The afore-mentioned various additional elements can also be applied to every aspect.

In case where the present invention is configured as a computer program or a recording medium that is recorded with the program, the program may be configured to drive an image display device or a playback device as a whole, or may be configured that only a part of the program achieves the functions of the present invention. Available examples of the recording medium include: flexible disks, CD-ROMs, DVD-ROMs, magneto-optical disks, IC cards, ROM cartridges, punch cards, prints with barcodes or other codes printed thereon, and internal storage devices (memories, such as a RAM or a ROM) and external storage devices of the computer, and a variety of other computer readable media.

DESCRIPTION OF THE PREFERRED EMBODIMENTS

Modes of implementation of the present invention are described below based on embodiments in the following order.

Figure 1:
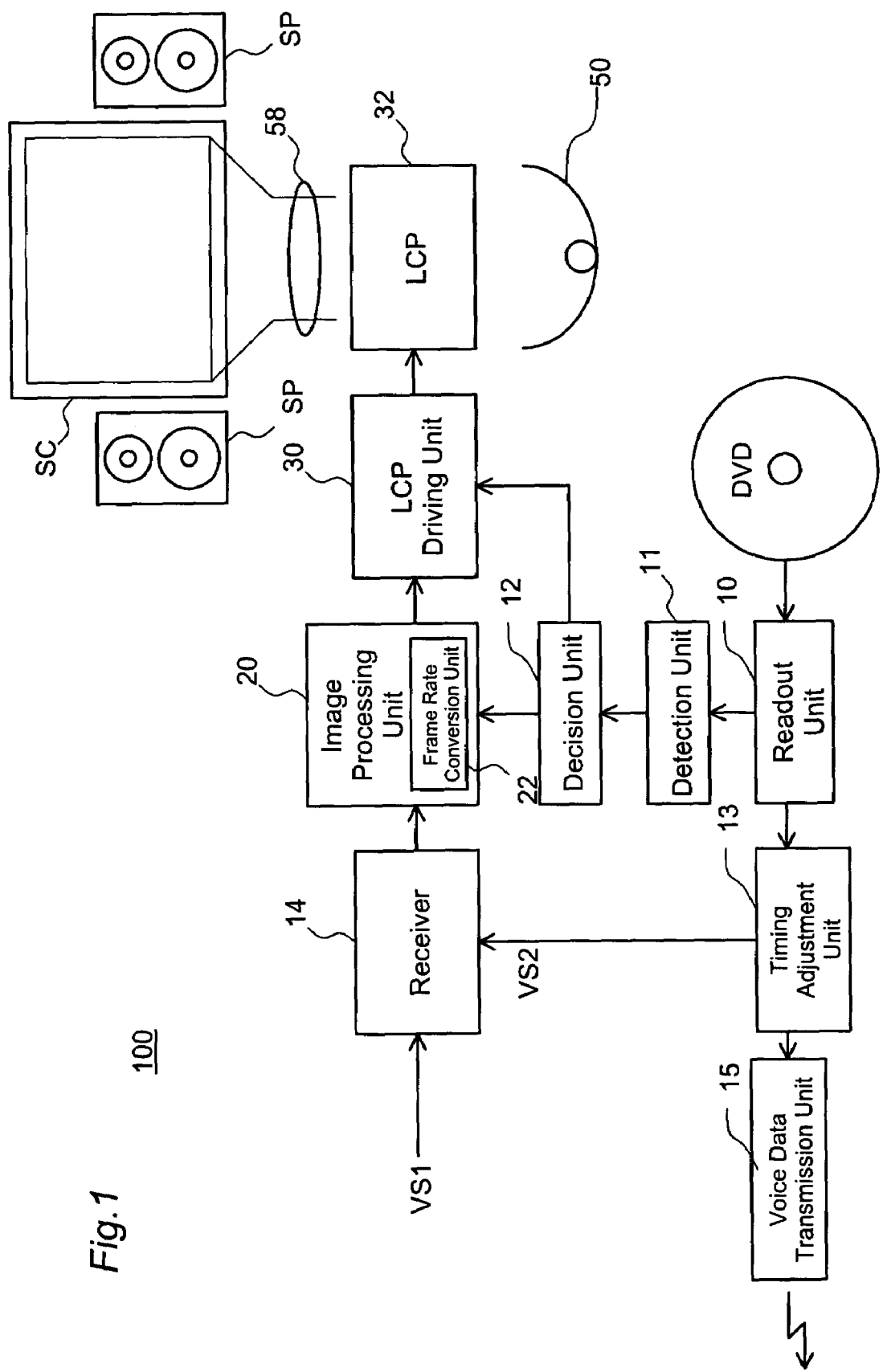
FIG. 1 is a schematic that shows the general structure of a projector 100 as a first embodiment of the present invention.

A. First embodiment
  A1. Structure of Projector:
  A2. Conversion Processing of Frame Rate:

B. Second embodiment:

C. Modifications:

A. First Embodiment:

A1. Structure of Projector:

FIG. 1 is a schematic that shows the general structure of a projector 100 as a first embodiment of the present invention. The projector 100 comprises: a receiver 14, an image processing unit 20, a liquid crystal panel (LCP) driving unit 30, and a liquid crystal panel (LCP) 32. The projector 100 further comprises: an illumination system 50 for illuminating the LCP 32; and a projection optical system 58 for projecting transmitted lights that transmitted through the LCP 32 onto a screen SC.

The projector 100 of the present embodiment is further equipped with a play back function for DVDs, and comprises a readout unit 10, a detection unit 11, a decision unit 12, a timing adjustment unit 13, and a voice data transmission unit 15. These elements are configured by hardware in the present embodiment. Alternatively, at least a part of them may be configured by software. In the present embodiment, the screen SC is placed in front of a user, and the projector 100 is placed behind the user. In addition, a voice output device SPs, which are separate from the projector 100, are placed on each side of the screen SC as shown.

The readout unit 10 reads out movie data and voice data from a DVD. The DVD is recorded with movie data that was compressed under MPEG2. The detection unit 11 detects a frame rate of the movie data. Since the movie data that is recorded in the DVD and was compressed under MPEG2 includes a frame rate code that indicates a display cycle of images, the detection unit 11 can use the frame rate code to detect the frame rate.

The decision unit 12 decides whether or not a conversion of frame rate is necessary, based on the frame rate that was detected by the detection unit 11. In the present embodiment, the decision unit 12 decides that the frame rate should be converted into 72 (fps) when the movie data that was read out from the DVD has a frame rate of 24 (fps), i.e. in case where the movie data is of a movie film. When it was decided that the conversion of frame rate is necessary, the decision unit 12 also outputs a signal for converting the frame rate into 72 (fps) to a frame rate conversion unit 22, which will be described later, and outputs a signal for driving the LCP 32 in 72 (Hz) to the LCP driving unit 30.

The timing adjustment unit 13 adjusts at least one of an output timing of movie data VS2 to the receiver 14 and an output timing of voice data to the voice data transmission unit 15, so as to synchronize output timing of voices and images. For example, in case where the processing of voice data later than the processing of image data, the timing adjustment unit 13 delays the processing timing of the image processing unit 20. In the present embodiment, a user compares the output of images and the voices and inputs an adjustment value for the adjustment of timing. Alternatively, the adjustment value may be set automatically. In this way, it is possible to reduce the gap between the display timing of movies in the projector 100 and the output timing of voices in the voice output devices SP.

The voice data transmission unit 15 wirelessly transmits the voice data that was read out by the readout unit 10 to the voice output devices SP. The wireless transmission may be conducted through electric waves or may be conducted through lights such as infrared rays. In this way, it is possible to remove the burden of wiring the voice output devices SP that are placed far away from the projector 100.

The receiver 14 is input with image signals VS1 that have different signal formats or different vertical sync frequencies, such as interlace signals in NTSC or PAL format and analog or digital image signals provided from a personal computer not shown, or with movie data VS2 that was read out from a DVD, and converts them into image data that is processable in the image processing unit 20. The movie data VS2 comprises progressive signals that are progressively displayable.

For the image data that was input via the receiver 14, the image processing unit 20 performs various image processing such as an image adjustment including brightness adjustment, contrast adjustment, and sharpness adjustment, or a keystone correction such as in case of performing a tilted projection by the projector 100. In case where the image signals VS1 are interlace signals, the image processing unit 20 also performs a so-called IP conversion so as to progressively display the images on the LCP 32. The image processing unit 20 also comprises the frame rate conversion unit 22, which converts the frame rate of image data to synchronize it with the driving frequency of the LCP 32. The frame rate conversion unit 22 also converts the frame rate into 72 (fps) according to the signal from the decision unit 12.

Based on the image data that was generated in the image processing unit 20, the LCP driving unit 30 generates a driving signal for driving the LCP 32. The refresh rate of the LCP 32 (the driving frequency of the LCP 32) can be switched between three frequencies: 50 (Hz), 60 (Hz), and 72 (Hz) according to the types of the image signals VS1 and the movie data VS2. For example, in case where the image signals VS1 are NTSC signals, the signals have a vertical sync frequency of 60 (Hz), and the driving frequency of the LCP 32 is set to 60 (Hz). In case where the image signals VS1 are PAL signals, the signals have a vertical sync frequency of 50 (Hz), so that the driving frequency of the LCP 32 is set to 50 (Hz). Furthermore, in case where the movie data VS2 comprises a movie film, the driving frequency of the LCP 32 is set to 72 (Hz) according to the signal from the decision unit 12. In case where the movie data VS2 comprises video image data of 60 (fps), the driving frequency of the LCP 32 is set to 60 (Hz). The driving frequency of the LCP 32 may also be switched between more varieties of frequencies.

The LCP 32 modulates the illumination according to the driving signal generated in the LCP driving unit 30. The LCP 32 is a LCP of transmissive type, and is used as a light valve (a light modulator) for modulating the illumination emitted from the illumination system 50.

Although not illustrated, the projector 100 comprises three LCPs 32 for colors RGB respectively. In addition, each circuit is equipped with a function for processing the three colors of image data. The illumination system 50 comprises a color light separation optical system that separates a white light into the three colors of light. In addition, the projection optical system 58 comprises a combination optical system that combines the three colors of image light and generates an image light that represents a color image.

Figure 2:
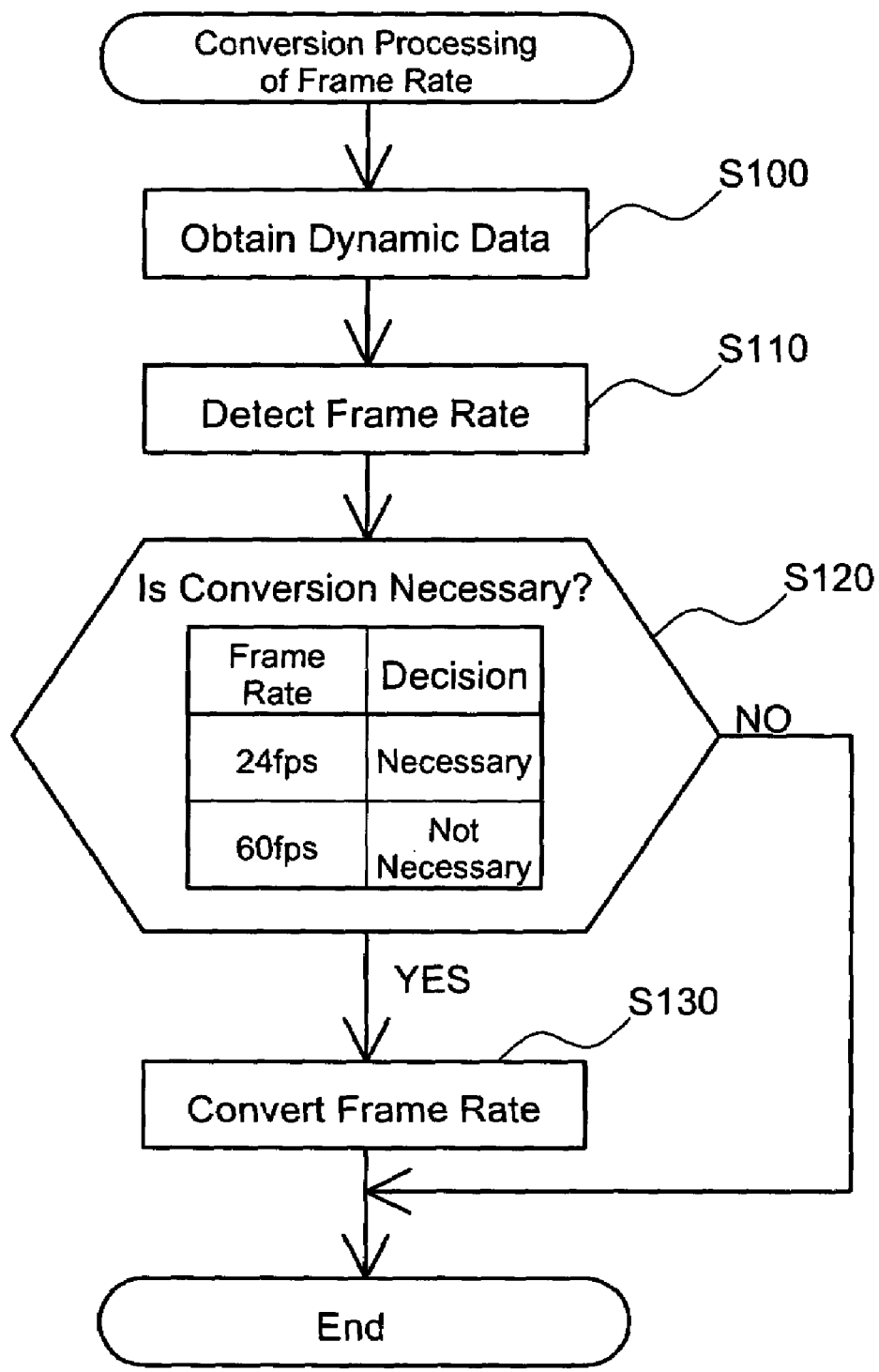
FIG. 2 is a flowchart that shows the flow of the conversion processing of frame rate.

A2. Conversion Processing of Frame Rate:

FIG. 2 is a flowchart of the conversion processing of frame rate. First, the readout unit 10 obtains movie data from a DVD (step S100). As described previously, the movie data comprises progressively displayable data. Next, the detection unit 11 detects a frame rate of the movie data (step S110). The decision unit 12 then detects whether or not a conversion of frame rate is necessary (step S120). In case where the frame rate of the movie data is 24 (fps), i.e. in case where the movie data comprises a movie film, it is decided that the conversion of frame rate is necessary, and the frame rate conversion unit 22 converts the frame rate of 24 (fps) into the triple i.e. 72 (fps) (step S130). In case where the frame rate of the movie data is 60 (fps), the conversion of frame rate is not performed. The conversion processing of frame rate is thus completed.

Figure 3:
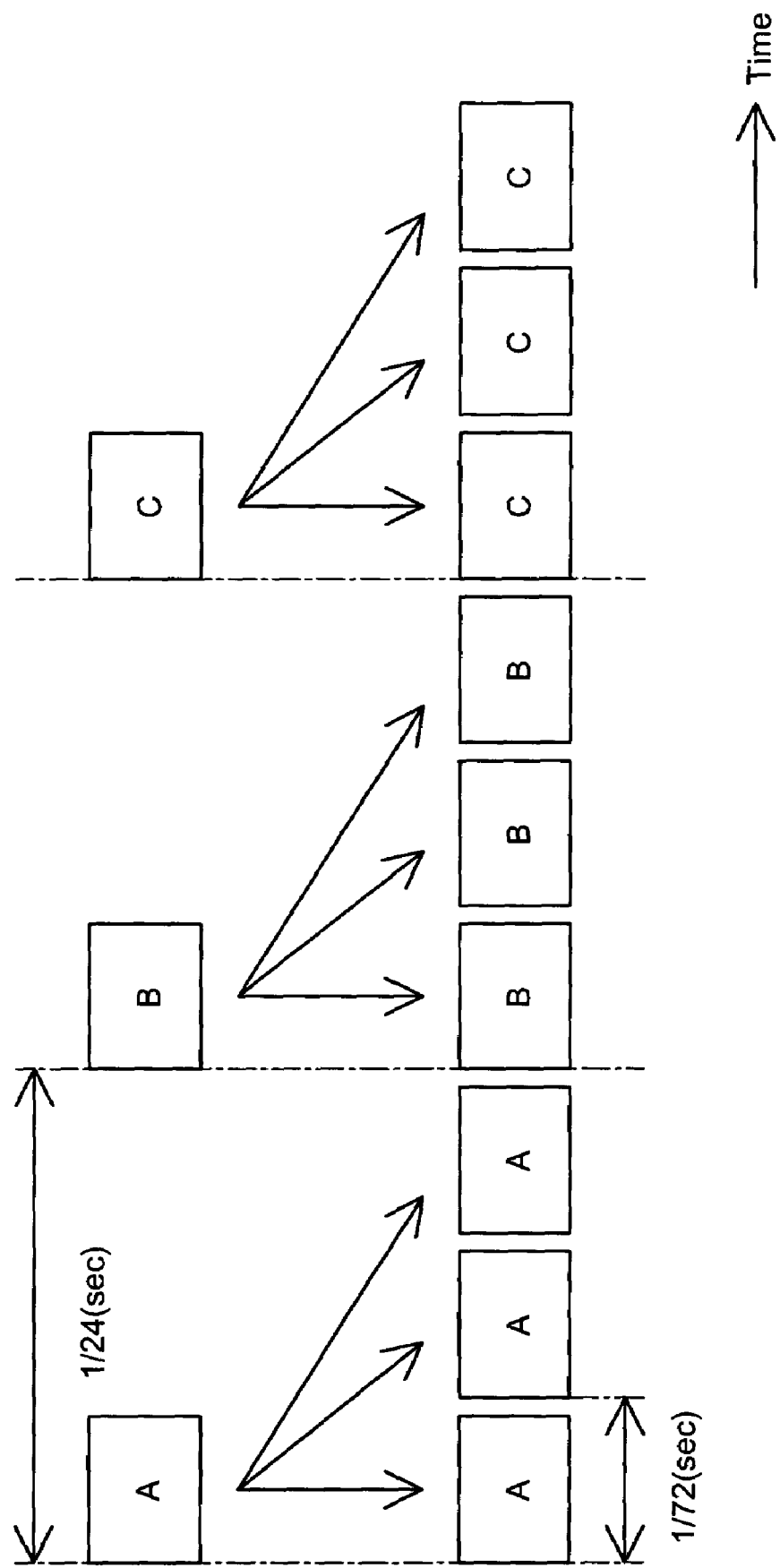
FIG. 3 is a schematic that shows the way the conversion of frame rate of a film is performed in the first embodiment.

In the present embodiment, the afore-mentioned conversion of frame rate in the step S130 is performed as follows. FIG. 3 is a schematic that shows the way the conversion of frame rate of a film is performed in the first embodiment. The upper part of FIG. 3 shows frame images of the movie film before the conversion of frame rate. As shown, the frame images are switched from a frame image A to a frame image B, and to a frame image C in every $1/24$ (sec). The lower part of FIG. 3 shows frame images after the conversion of frame rate. As shown, the frame images are switched from a frame image A to a frame image A, a frame image A, a frame image B, and so on in every $1/72$ (sec). As shown, the conversion of frame rate in the present embodiment converts the frame images into those having 72 frames per second by repeatedly outputting each identical frame image for three times respectively. In this way, the conversion of frame rate can be performed easily.

According to the projector 100 of the first embodiment described above, neither a telecine conversion nor an IP conversion is necessary in the process of playing back a film that is recorded in a DVD. It is thus possible to suppress the degradation of the image quality of movies and to display a smooth movement.

Figure 4:
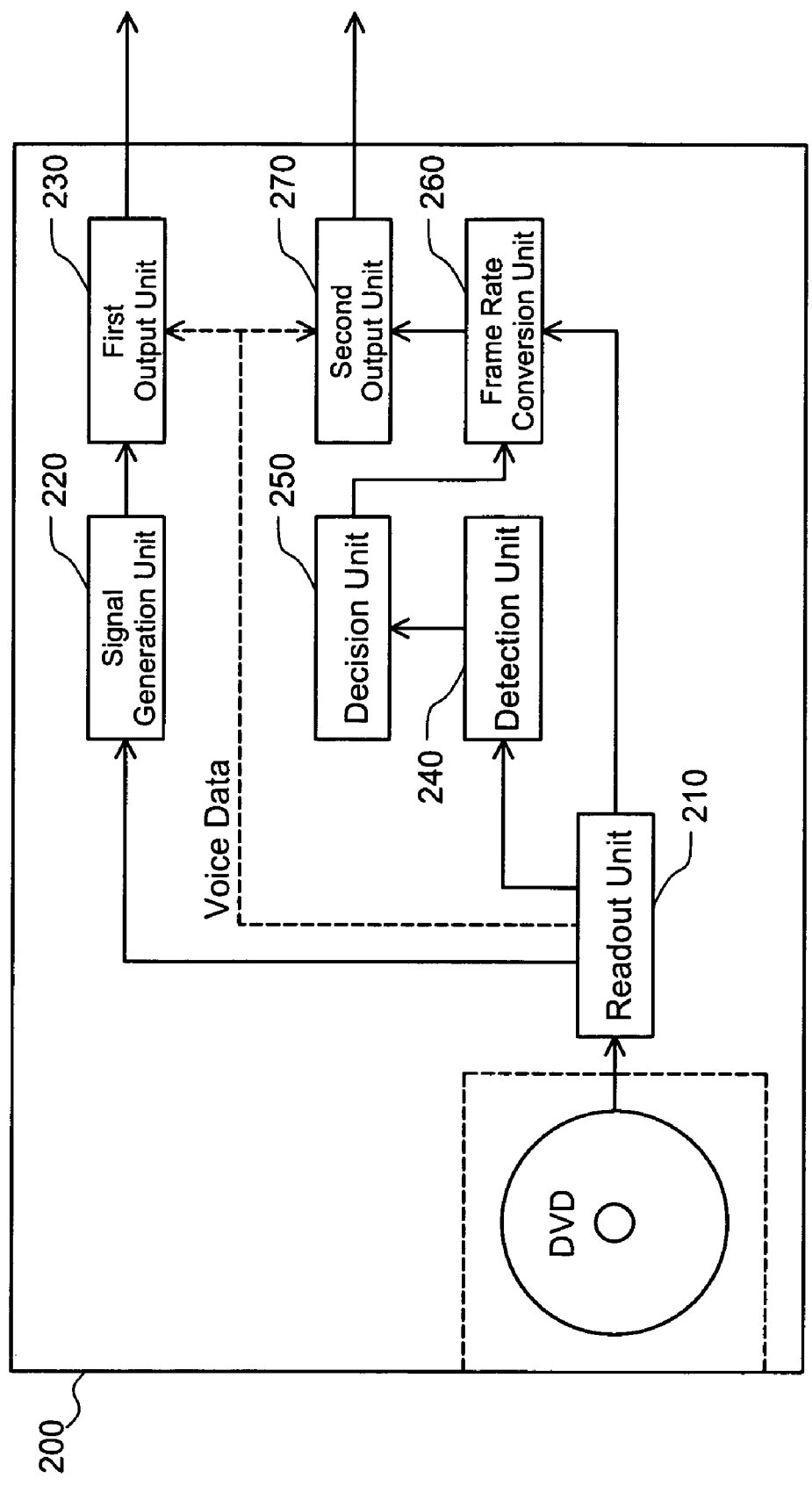
FIG. 4 is a schematic that shows the general structure of a DVD playback device 200 as a second embodiment of the present invention.

B. Second Embodiment:

The first embodiment was described with respect to a projector 100 that is equipped with a DVD playback function, whereas a second embodiment is described with respect to a DVD playback device that is separate from a projector. FIG. 4 is a schematic that shows the general structure of a DVD playback device 200 as a second embodiment of the present invention. The DVD playback device 200 comprises each functional block in the figure as hardware. Alternatively, at least a part of them may be configured as software.

A readout unit 210 reads out movie data and voice data from a DVD. A signal generation unit 220 converts progressive signals, which were read out from the DVD, into interlace signals so as to make them displayable on a TV. In case where the movie data that was read out from the DVD comprises a movie film having a frame rate of 24 (fps), the signal generation unit 220 further performs a telecine conversion. A first output unit 230 outputs the voice data that was read out by the readout unit 210 and the interlace signals that were generated in the signal generation unit 220. The output data are input into an image display device, which is input with interlace signals and displays images, such as a TV.

A detection unit 240 detects a frame rate of the movie data that was read out by the readout unit 210. A decision unit 250 decides whether or not a conversion of frame rate is necessary, based on the frame rate that was detected by the detection unit 240. Similar to the first embodiment, in case where the movie data that was read out from the DVD has a frame rate of 24 (fps), i.e. in case where the movie data comprises a movie film, the decision unit 250 in the present embodiment decides that the frame rate should be converted into 72 (fps). In addition, in case where the conversion of frame rate was decided to be necessary, the decision unit 250 outputs a signal that causes a frame rate conversion unit 260 to convert the frame rate into 72 (fps). The frame rate conversion unit 260 thus converts the frame rate of 24 (fps) into the triple i.e. 72 (fps) according to the signal from the decision unit 12.

In case where the frame rate of the movie data is 60 (fps), the frame rate conversion unit 260 does not perform the conversion of frame rate. That is to say, the conversion processing of frame rate in the second embodiment is performed similarly to the one in the first embodiment shown in FIG. 2.

A second output unit 270 outputs the voice data that was read out by the readout unit 210 and the progressive signals of 60 (fps) or 72 (fps) that were processed in the frame rate conversion unit 260. The output data are input into an image display device, which is input with progressive signals and can change the display cycle of images according to the frame rate of input signals.

According to the DVD playback device 200 of the second embodiment described above, the movie data of 24 (fps) that comprises a movie film or the movie data of 60 (fps), which was read out from the DVD, can be output as progressive signals without going through a telecine conversion or a conversion into interlace signals, respectively. In this way, the image display device does not need to perform the IP conversion, and thus is capable of displaying the movies that are recorded in the DVD without the degradation of its image quality.

C. Modifications:

Although the present invention was described with respect to several embodiments, the present invention is in no way restricted to these specific embodiments, but can be implemented in various aspects without departing from the spirit of the present invention. For example, the following modifications are possible.

Figure 5:
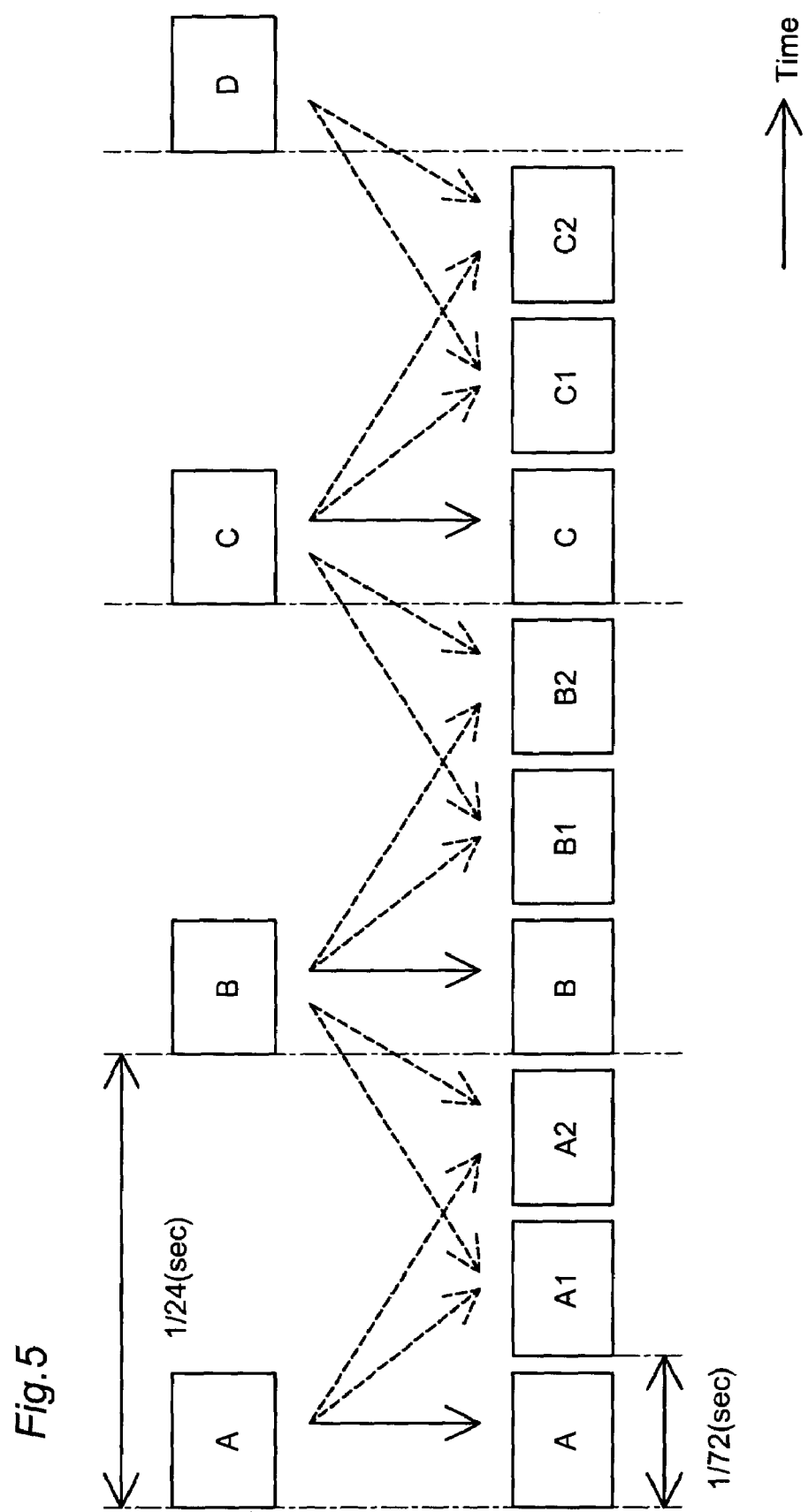
FIG. 5 is a schematic that shows the way the conversion of frame rate of a film is performed in a modification.

C1. Modification 1:

In the conversion processing of frame rate of a film in the first and the second embodiments, the conversion of frame rate was performed by repeatedly outputting each identical frame image, but the processing is not necessarily performed in this way. FIG. 5 is a schematic that shows the way the conversion of frame rate of a film is performed in a modification. The upper part of FIG. 5 shows frame images of a movie film before the conversion of frame rate. The lower part of FIG. 5 shows frame images after the conversion of frame rate. In the lower part of FIG. 5, frame image A1, A2 that are inserted between a frame image A and a frame image B are the predictive frame images that were generated based on the frame image A and the frame image B. Frame image B1, B2 that are inserted between the frame image B and a frame image C are the predictive frame images that are generated based on the frame image B and the frame image C. Frame image C1, C2 that are inserted between the frame image C and a frame image D are the predictive frame images that are generated based on the frame image C and the frame image D. In the present embodiment, two predictive frame images are generated due to the fact that the frame rate is converted from 24 (fps) to 72 (fps). For example, in case where the frame rate is quadrupled, three predictive frame images may be generated and inserted. In this way, the movie film can be displayed in more smooth movement than in the first embodiment, by performing the conversion of frame rate by generating and inserting the predicted frame images.

C2. Modification 2:

Although the DVD playback device 200 has performed the conversion of frame rate in the second embodiment, it may or may not perform the conversion of frame rate. In other words, the DVD playback device may have a configuration not including the detection unit 240, the decision unit 250, and the frame rate conversion unit 260. That is to say, the second output unit 270 may output progressive signals that were read out by the readout unit 210 and having a frame rate of 24 (fps) or 60 (fps). In this case, functional blocks that correspond to the detection unit 240, the decision unit 250, and the frame rate conversion unit 260 in the DVD playback device 200 may be provided to the part of an image display device, which is capable of changing the display cycle of images according to the frame rate of input movie data.

C3. Modification 3:

Although the second embodiment was described with respect to a case where the present invention is applied to a DVD playback device, the present invention is not necessarily applied to such a device. The present invention is generally applicable to any playback device for playing back movie data that is recorded in a recording medium such as hard disk or CD.

In addition, although the movie data is compressed under MPEG2 in the above embodiments, the movie data is not necessarily compressed under MPEG2. Alternatively, the movie data may be compressed under other compression technology. Alternatively, the movie data may be not compressed. Accordingly, the detection unit may detect the frame rate of movies by using information other than a frame rate code, such as a synchronization signal of each frame.

C4. Modification 4:

Although the first embodiment was described with respect to a case where the present invention is applied to a projector, the present invention is not necessarily applied to a projector. The present invention is applicable to any image display device that progressively displays images and comprises a LCP or a CRT.

What is claimed is:

1. An image display device that displays images on an image generation unit that is switchable of driving frequency, comprising:
an input unit that inputs voice data along with movie data;
a detection unit that detects a frame rate of said movie data;
a decision unit that decides, based on said frame rate, whether or not a conversion of said frame rate is necessary;
a frame rate conversion unit that converts said frame rate by multiplying said frame rate by n (n is an integer that is equal to or more than two), when it was decided that the conversion of said frame rate is necessary;

a driving frequency control unit that switch-controls a driving frequency of said image generation unit so as to synchronize it with said frame rate; and a transmission unit for wirelessly transmitting said voice data to a voice output device, which is separate from said image display device.

2. An image display device according to claim 1, wherein said frame rate conversion unit converts said frame rate by repeatedly outputting an identical frame for n times.

3. An image display device according to claim 1, wherein said frame rate conversion unit converts said frame rate by, based on successive two frames, generating and inserting (n−1) predictive frames to be inserted between said two frames.

4. An image display device according to claim 1, further comprising:

a timing adjustment unit that adjusts at least one of an image generation timing of said image generation unit and a transmission timing of said transmission unit, so as to synchronize a voice output timing on the part of said voice output device and the image generation timing of said image generation unit.

5. An image display device according to claim 1, further comprising:

a readout unit that reads out said movie data from a given recording medium;

wherein said input unit inputs the movie data that was read out from said readout unit.

6. A playback device that plays back movie data that is recorded in a given recording medium, comprising:

a readout unit that reads out voice data along with said movie data from said recording medium;

a detection unit that detects a frame rate of said movie data;

a decision unit that decides, based on said frame rate, whether or not a conversion of said frame rate is necessary;

a frame rate conversion unit that converts said frame rate by multiplying said frame rate by n (n is an integer that is equal to or more than two), when it was decided that the conversion of said frame rate is necessary;

an output unit that outputs said movie data; and a transmission unit for wirelessly transmitting said voice data to a voice output device, which is separate from said playback device.

7. A method of controlling an image display device that comprises an image generation unit that is switchable of driving frequency, said method comprising:

(a) obtaining voice data along with movie data;
(b) detecting a frame rate of said movie data;
(c) based on said frame rate, deciding whether or not a conversion of said frame rate is necessary;
(d) when it was decided that the conversion of said frame rate is necessary, converting said frame rate by multiplying said frame rate by n (n is an integer that is equal to or more than two);
(e) switch-controlling a driving frequency of said image generation unit so as to synchronize it with said frame rate; and
(f) wirelessly transmitting said voice data to a voice output device, which is separate from said image display device.

8. A method of playing back movie data that is recorded in a given recording medium, comprising:

(a) reading out voice data along with said movie data from said recording medium;
(b) detecting a frame rate of said movie data;
(c) based on said frame rate, deciding whether or not a conversion of said frame rate is necessary;
(d) when it was decided that the conversion of said frame rate is necessary, converting said frame rate by multiplying said frame rate by n (n is an integer that is equal to or more than two);
(e) outputting said movie data; and
(f) wirelessly transmitting said voice data to a voice output device, which is separate from said playback device.

9. A computer readable media recorded with a computer program for controlling an image display device that comprises an image generation unit that is switchable of driving frequency, said computer program causes a computer to implement the functions of:

obtaining voice data along with movie data;

detecting a frame rate of said movie data;

based on said frame rate, deciding whether or not a conversion of said frame rate is necessary;

when it was decided that the conversion of said frame rate is necessary, converting said frame rate by multiplying said frame rate by n (n is an integer that is equal to or more than two);

switch-controlling a driving frequency of said image generation unit so as to synchronize it with said frame rate; and wirelessly transmitting said voice data to a voice output device, which is separate from said image display device.

10. A computer readable media recorded with a computer program for playing back movie data that is recorded in a given recording medium, said computer program causes a computer to implement the functions of:

reading out voice data along with said movie data from said recording medium;

detecting a frame rate of said movie data;

based on said frame rate, deciding whether or not a conversion of said frame rate is necessary;

when it was decided that the conversion of said frame rate is necessary, converting said frame rate by multiplying said frame rate by n (n is an integer that is equal to or more than two);

outputting said movie data with a playback device; and wirelessly transmitting said voice data to a voice output device, which is separate from said playback device.

* * * * *